United States Patent
Sarda et al.

(10) Patent No.: US 9,813,780 B2
(45) Date of Patent: Nov. 7, 2017

(54) DEVICE AND METHOD TO MARK DIGITAL AUDIO OR AUDIO AND/OR VIDEO CONTENT

(71) Applicant: NAGRAVISION S.A., Cheseaux-sur-Lausanne (CH)

(72) Inventors: Pierre Sarda, Echallens (CH); Jean-Philippe Aumasson, Vuibroye (CH); Minh Son Tran, Bourg la Reine (FR)

(73) Assignee: NAGRAVISION S.A., Cheseaux-sur (CH)

( * ) Notice: Subject to any disclaimer, the term of this patent is extended or adjusted under 35 U.S.C. 154(b) by 0 days.

(21) Appl. No.: 15/032,165

(22) PCT Filed: Nov. 3, 2014

(86) PCT No.: PCT/EP2014/073605
§ 371 (c)(1),
(2) Date: Apr. 26, 2016

(87) PCT Pub. No.: WO2015/063308
PCT Pub. Date: May 7, 2015

(65) Prior Publication Data
US 2016/0261928 A1    Sep. 8, 2016

(30) Foreign Application Priority Data

Nov. 4, 2013 (EP) ..................... 13191459

(51) Int. Cl.
*H04N 7/167*    (2011.01)
*H04N 21/8358*    (2011.01)
(Continued)

(52) U.S. Cl.
CPC ..... *H04N 21/8358* (2013.01); *H04N 21/4182* (2013.01); *H04N 21/4343* (2013.01);
(Continued)

(58) Field of Classification Search
CPC ..................... H04N 21/835; H04N 21/8358
See application file for complete search history.

(56) References Cited

U.S. PATENT DOCUMENTS

| | | |
|---|---|---|
| 7,394,519 B1 | 7/2008 | Mossman et al. |
| 7,818,257 B2 | 10/2010 | Deworld |
| (Continued) | | |

FOREIGN PATENT DOCUMENTS

| | | |
|---|---|---|
| EP | 2 387 250 | 11/2011 |
| WO | WO 2008/097918 | 8/2008 |

OTHER PUBLICATIONS

International Search Report and Written Opinion issued in International Application No. PCT/EP2014/073605 dated Jan. 29, 2015.

*Primary Examiner* — Gigi L Dubasky
(74) *Attorney, Agent, or Firm* — DLA Piper LLP US (57) ABSTRACT

A receiver device having a processor, memories, descrambler and decoders modules configured to produce a sequence of elementary media content packets. The receiver device further comprises a marker unit configured to mark data in the sequence of elementary media content packets according to a pattern defined by an internal parameter associated to the receiving device. The marker unit is configured to determine, in the sequence of elementary media content packets at least one segment of a predetermined length and starting at a predetermined position in the sequence, to divide the segment into a predetermined number of contiguous windows including data of all or part of at least one elementary media content packet. Each window in the segment defined in the sequence of elementary media content packets is indexed by an index defining a position of a window in the segment. The marker unit codes the internal parameter by applying a mathematical transformation function, obtaining a resulting bits string, calculates position indices of a predetermined number of windows on the basis (Continued)

of all or a portion of the resulting bits string, said predetermined number of windows being lower than the number of windows in the segment, and modifies data in the windows designated by the calculated position indices. The windows including modified data and the windows including original data from within the segment of elementary media content packets a unique pattern representing the internal parameter associated to the receiving device.

15 Claims, 2 Drawing Sheets

(51) Int. Cl.
- *H04N 21/418* (2011.01)
- *H04N 21/439* (2011.01)
- *H04N 21/4402* (2011.01)
- *H04N 21/845* (2011.01)
- *H04N 21/434* (2011.01)

(52) U.S. Cl.
CPC ..... *H04N 21/4398* (2013.01); *H04N 21/4402* (2013.01); *H04N 21/8456* (2013.01)

(56) References Cited

U.S. PATENT DOCUMENTS

| | | | |
|---|---|---|---|
| 2002/0076082 A1* | 6/2002 | Arimura | H04N 5/913 382/100 |
| 2007/0160297 A1* | 7/2007 | West | H04N 21/4402 382/232 |
| 2007/0218901 A1* | 9/2007 | Tenny | H04L 29/12254 455/436 |
| 2007/0242826 A1 | 10/2007 | Rassool | |
| 2009/0049302 A1 | 2/2009 | Zhao et al. | |
| 2010/0027684 A1 | 2/2010 | Zou et al. | |
| 2010/0100742 A1 | 4/2010 | Courington et al. | |
| 2010/0169349 A1 | 7/2010 | Zou et al. | |
| 2011/0280434 A1 | 11/2011 | Mamidwar et al. | |

* cited by examiner

DEVICE AND METHOD TO MARK DIGITAL AUDIO OR AUDIO AND/OR VIDEO CONTENT

CROSS REFERENCE TO RELATED APPLICATIONS

This application is a U.S. National Stage Application of International Application No. PCT/EP2014/073605 filed Nov. 3, 2014, which claims priority from European Patent Application No. 13191459.0 filed Nov. 4, 2013.

FIELD OF THE INVENTION

The present invention relates to a device and a method for marking or fingerprinting digital audio or audio and/or video content data to identify their origin in order to prevent unauthorized distribution of copies.

TECHNICAL BACKGROUND

In the field of digital audio or audio and/or video processing, forensic watermarking, also called fingerprinting, is a common technique to mark the data processed by a receiving device. It is a way to trace the content if the latter is found on Internet for example, without protection. Various solutions exist to embed a mark in an audio and/or audio and/or video content once said audio and/or audio and/or video content is descrambled. A first approach is to embed this information at broadcast side. The server carefully combines the information with the audio and/or video content in order to hide it into the content and the receiver can extract the information back for authentication of the content. Another approach is the one in which once an audio and/or audio and/or video stream is descrambled, the receiving device adds a mark specific to an identification of the receiving device. Inserting information into an audio or video content is a complex process, where invisibility or inaudibility without compromise on the mark's robustness is the main target. In some cases, due to the insertion mechanism, it is impossible to reach a perfect invisibility or inaudibility. Then, diminishing the effect on the content due to the information insertion is a key to reach a usable solution.

Fingerprinting techniques are disclosed for example in document WO2008/097918A2 which describes a system and method for encoding an identifiable code into the content of an audio recording, such as a copy of a motion picture. The audio content is altered in at least one specific pre-selected location in the audio soundtrack of the copy so as to be essentially unnoticeable to a listener. The audio content is altered to form an identifiable code which represents a unique number applied to that copy of the motion picture, whereupon any audio recording of the playback of such audio content would capture the identifiable code. The unique number is recorded and stored, together with an identification of the person or entity who receives the copy when it is distributed, so as to enable law enforcement personnel to review suspected counterfeit copies of the motion picture to read the code number and identify the recipient of the copy and thereby track down the source of the counterfeit copies.

Document U.S. Pat. No. 7,818,257B2 discloses a system and a method for encoding in a unique way each of a substantial number of distribution video copies of a program such as a motion picture by altering the images slightly at several pre-selected locations in the program in a uniquely coded pattern. Suspected counterfeits can be compared with an unaltered master video to determine the encoded number for the copy which was counterfeited to enable tracking the source of the counterfeit. Preferably, each frame of several whole scenes is altered at each location by shifting an image so as to make the alterations largely undetectable by counterfeiters but easily detected by comparison with an unaltered master video. Artifacts are inserted in patterns representing a unique number for the program. These supplement the encoding by alteration of images and gives added means to aid in tracing counterfeit copies.

Document US2007/0242826A1 discloses a system and a method for marking audio/video signals for use in tracing content to a source. An ID controller captures an audio/video synchronization fingerprint from a master audio/video signal, stores the fingerprint in a data store, and provides signals to an ID encoder to have encoded an identifier into a copy of the master audio/video signal. The identifier is encoded to be persistent through actions such as capture, compression, and/or transcoding. The encoded identifier within the copied audio/video signal may later be determined by extracting the fingerprint and comparing it to the stored fingerprint to determine the identifier. The identifier may then be used to trace a source of the copied audio/video signal.

Document US2010/100742A1 discloses methods and apparatuses for processing and watermarking a transport stream with a message. A processed transport stream that includes processed content packets, associated carrier packets, and a watermark descriptor for a group of the associated carrier packets is created from the transport stream. The processed content data represent a first watermark value and are bounded by transport sector boundaries. The associated carrier packets include replacement watermark data that represent a second watermark value and are bounded by transport sector boundaries. These associated carrier packets are paired with processed content packets. The watermark descriptor includes synchronization data. A watermarked transport stream is created by interleaving selected processed content packets and associated carrier packets according to a watermark message.

Document EP2387250A1 discloses a method and system for watermark insertion using video start codes. In various embodiments, a receiver is configured to receive, based on embedded watermarks in a compressed video stream which comprises a plurality of video frames, a default version for each portion of each of the plurality of video frames in the compressed video stream, and an alternative version and corresponding watermark control information for one or more portions of one or more of the plurality of video frames in the compressed video stream. According to an embodiment, the default version may comprise video data with no watermark and the alternative version may comprise the video data with a watermark. In another exemplary embodiment, the default version may comprise video data with one type of watermark and the alternative version may comprise the video data with a different type of watermark. A start code which may comprise a start code suffix with a data type value may be utilized for each of the default versions. A start code which may comprise a start code suffix with a first reserved value may be utilized for each of the alternative versions. A start code which may comprise a start code suffix with a second reserved value may be utilized for each of the corresponding watermark control information.

Document US2010/169349A1 discloses methods for modifying, or using, a coded bitstream, or for recovering watermarking information from data. In one implementation, a coded bitstream is modified to allow for the application of a watermark to the coded bitstream without changing the coding of any other syntax elements in the bitstream. This is performed by identifying conditions necessary to change a coded syntax element without disrupting the interpretation of subsequent coded elements. The coded syntax element is replaced with another coded value if the modified value generates the same decoding variables as the original value would have generated. Particular implementations focus on syntax elements coded using entropy coding, including, for example, Context-based Adaptive Binary Arithmetic Coding (CABAC); Regardless of the type of coding or watermarking, various implementations may provide for recovering watermarking information. Particular implementations recover watermarking information using detection data and feature information.

Document US2009/049302A1 discloses a method and system for processing content including generating dummy values, multiplexing the dummy values with a transport stream of the content, selecting at least one position in the content where a value in the content is to be replaced by an alternative value containing a watermark signal, generating at least one alternative value and inserting the at least one alternative value in the content. The method creates dummy data (or padding data) as "place holders" during content encoding and authoring. At a later stage, these dummy data are replaced by real additional data (watermarks and other data). The real additional data is inserted into the encoded/multiplexed content without re-encoding or re-multiplexing. Thus, the additional data are inserted into the encoded and multiplexed content with minimal further processing of the content and with minimal impact on the workflow. Content as used herein includes video, audio and any other multimedia content.

The above techniques have the following common points while inserting a mark into a media data:
- The unique identifier to be inserted is a static, pre-created pattern of modifications applied to the media. It cannot be generated on-the-fly while being inserted. Future scaling up is not possible.
- The extraction of the mark is not a blind-detection process. There is no mechanism to self-extract the modifications positions and interpret them appropriately. Thus it needs access to reference information to be able to recover the mark.
- It is not possible to further optimize the distortion. Fine-tuning the impact of mark insertion is no longer possible once the way of modification is determined.

SUMMARY OF THE INVENTION

To overcome the above shortcomings, an aim of the present invention is to propose an improved technique of mark insertion in digital audio or audio and/or video content data by managing and minimizing the number of modifications—also called glitches—and therefore reducing the undesirable distortion of inserted marks into audio and/or video content.

This aim is achieved by a method to mark an elementary media content of a stream of digital data packets received by a receiver device, the receiver device comprising at least one processor, memories, a descrambler, decoder modules producing a sequence of elementary media content packets, the receiver device further comprises a marker unit configured to mark by modifying data in the sequence of elementary media content packets according to a pattern defined by an internal parameter associated to the receiving device, the method comprising steps of:

determining, by the marker unit, in the sequence of elementary media content packets at least one segment of a predetermined length and starting at a predetermined position in the sequence, dividing the segment into a predetermined number of contiguous windows including data of all or part of at least one elementary media content packet, the method is characterized in that it further comprises step of:

indexing each window in the segment defined in the sequence of elementary media content packets, each index defining a position of a window in the segment, coding the internal parameter by applying a mathematical transformation function, obtaining a resulting bits string, calculating position indices of a predetermined number of windows on the basis of all or a portion of the resulting bits string, said predetermined number of windows being lower than the number of windows in the segment, modifying data in the windows designated by the calculated position indices, the windows including modified data and the windows including original data form, within the segment of elementary media content packets, a unique pattern representing the internal parameter associated to the receiving device.

outputting elementary media content data packets including at least one sequence of modified elementary media packets.

A further object of the invention consists of a receiver device configured to mark an elementary media content of a stream of digital data packets, the receiver device including at least one processor, memories, a descrambler and decoders modules configured to produce a sequence of elementary media content packets, the receiver device further comprises a marker unit configured to mark by modifying data in the sequence of elementary media content packets according to a pattern defined by an internal parameter associated to the receiving device, the marker unit being configured to determine, in the sequence of elementary media content packets at least one segment of a predetermined length and starting at a predetermined position in the sequence, to divide the segment into a predetermined number of contiguous windows including data of all or part of at least one elementary media content packet, the marker unit is characterized in that it is further configured to:

index each window in the segment defined in the sequence of elementary media content packets, each index defining a position of a window in the segment, code the internal parameter by applying a mathematical transformation function, obtaining a resulting bits string, calculate position indices of a predetermined number of windows on the basis of all or a portion of the resulting bits string, said predetermined number of windows being lower than the number of windows in the segment, modify data in the windows designated by the calculated position indices, the windows including modified data and the windows including original data form, within the segment of elementary media content packets, a unique pattern representing the internal parameter associated to the receiving device.

output elementary media content data packets including at least one sequence of modified elementary media packets.

The sequence of elementary media packets includes either audio data packets or video data packets.

The data of the windows designated by the calculated position indices is modified preferably by adding a glitch producing a detectable distortion corresponding to a silence glitch in case of audio data or to distorted blocks of pixels in case of video data.

The receiver device of the invention is configured to insert modified data, hereafter referred to as glitches. The consecutive glitches can be introduced for instance by dropping some packets with a filter coupled to the marker unit programmed to produce a pattern corresponding to an internal parameter such as an identifier of the receiver device. The length and perceptible duration of the glitch is controlled so that they remain reasonable, for example under one second.

A predefined segment in a sequence of audio and/or video data is divided into N contiguous windows indexed from 0 to N−1. According to a preferred embodiment, each window within the segment may have a same length or duration. An identifier of the receiver device, for example, is assigned to a pattern comprising a set of windows each designated by an index calculated on the basis of a code or bits string representing the identifier. The number of windows in the set is lower than the total number of windows within the segment and each window of the set designated by the calculated index contains a glitch. The windows containing original data and the windows containing data modified by adding the glitch form thus a pattern within the segment. The glitch in a window may occupy the whole window or a part of it within the length of the window itself.

According to a preferred embodiment, the start of the segment is marked by a particular glitch whose length spreads to several windows as for example two or three times a window length. This start code produces a detectable distortion distinct from the distortion produced by the glitch inserted in the elementary media data.

According to another embodiment, the start of the segment is marked by two or three consecutive glitches, whose lengths are identical or equal to a predefined fractional part of length of the window.

Yet according to another embodiment, the position in the packets stream—hence the perceptible audio and/or video content—of the start of the segment is registered as a matching reference.

The identifier can be detected by observing and analyzing the audio and/or video packets sequence including a complete segment, which in turn consists of N windows in order to identify the position of the glitches. These position indices altogether form a pattern which is interpreted as an identifier or a representation thereof of the audio and/or video content source or of a processing device of the same.

This identifier may for example correspond to a unique identifier of the receiver device as a whole or a unique identifier of a personalized component of the receiver device such as a CAM module, a smartcard or any other module related to data security.

In a further embodiment, the marker unit may repeatedly determine a plurality of segments, within which windows are modified accordingly to form a pattern corresponding to a same identifier. An advantage of this repetition of segments and patterns is to ensure the detection of the pattern (therefore the identifier) even when several segments are skipped intentionally or unintentionally.

The marker unit is localized either after the decoder module or after the descrambler module or embedded inside the descrambler module. Therefore, the sequence of elementary media packets include respectively a sequence of uncompressed elementary media samples or a sequence of packetized compressed elementary media or a sequence of packetized scrambled elementary media.

BRIEF DESCRIPTION OF THE DRAWINGS

The invention will be better understood with the following detailed description, which refers to the attached figures given as non-limitative examples.

DETAILED DESCRIPTION

Reference will now be made in detail to the preferred embodiments of the invention with examples illustrated by the drawings. While the invention will describe in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
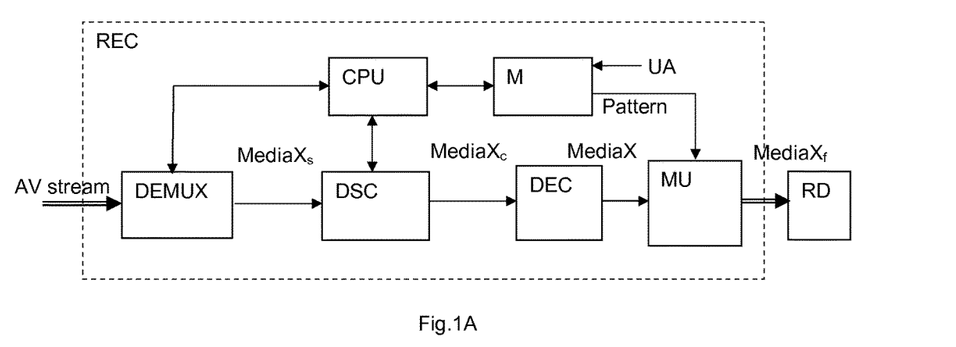
FIGS. 1A, 1B and 1C show block diagrams of different receiver device configurations suitable for performing descrambling, encoding and marking the audio and/or video data with an identifier according to the invention.
Figure 1B:
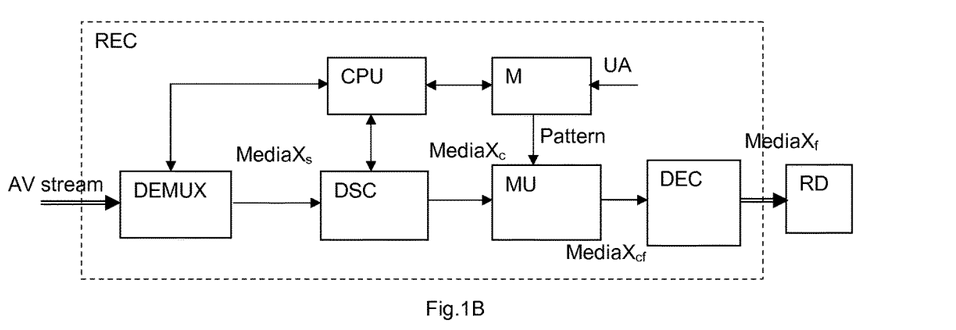
Figure 1C:
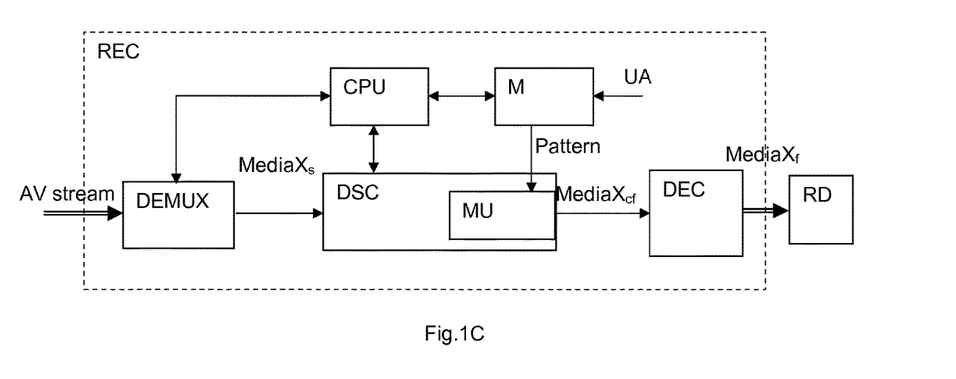

In the field of pay-TV, once an audio and/or video content is descrambled, it is favorable that the receiving device can add a mark specific to its identification to extend the scope of protection: ensuring content protection after the decryption steps, through final client's identifier insertion in the content, in order to discourage illegal distribution of the content. A receiving device has, for example, the form of a set-top-box, an advanced television set or a CAM (conditional access module) in charge of receiving the audio and/or video content data and removing encryption protection. For that purpose, the receiving device REC comprises at least one processor CPU managing a demultiplexer DEMUX for demultiplexing audio and/or video content packets of an input stream and at least one descrambler module DSC configured to descramble audio and/or video content data with a cryptographic key. The obtained descrambled but still compressed audio and/or video content data is then decoded by a decoder DEC module into a format suitable for a rendering device RD such as loudspeakers and/or TV screen. Memories M associated to the processor CPU storing receiver device REC operating programs, parameters and other data may also store a unique mark or identifier UA used to mark audio and/or video content data.

According to a preferred embodiment, the receiving device REC further comprises a marker unit MU which marks the content data with a unique mark UA being derived from an internal parameter of the receiving device REC such as the serial number. The receiving device REC comprises generally a security module to handle all the security operations. A security module may have various forms such as a removable module like a smartcard or a USB dongle, or it may be embedded in the receiving device in the form of a single chip mounted on a main circuit board or a mix of these forms.

According to a preferred embodiment of the invention, the data designated by MediaX in FIG. 1A, FIG. 1B and FIG. 1C represents audio data.

According to a preferred embodiment of the invention, the marker unit MU is placed after the decoder DEC of a pay TV receiver device REC as illustrated in the example of FIG. 1A. Scrambled and compressed audio data packets MediaX$_s$—filtered from other data of the multiplexed stream by the demultiplexer DEMUX—enter the descrambler DSC which outputs descrambled (but still encoded/compressed) audio data packets MediaX$_c$. These audio data packets MediaX$_c$ are then forwarded to the proper decoder DEC to obtain decoded audio data (MediaX) suitable for presentation by a rendering device RD.

In FIG. 1A, the marker unit MU selects at least one sequence of a plurality of audio samples found at the output of the decoder DEC: the selected sequence occupies at least one time period T of a predetermined duration and starts at a predetermined audio sample or predetermined audio media time. The time period T is then divided into a predetermined number N of contiguous time windows having each the same duration t and including the same number of audio samples. If certain windows are assigned to glitches according to the pattern assigned to this receiver device REC, the marker unit MU modifies audio samples in these windows by setting bits to zero for example. Hence, the resulting audio data MediaX$_f$ are marked and sent to the rendering device RD.

According to other embodiment, the marker unit is located between the descrambler DSC and the media decoder DEC as shown by FIG. 1B.

Without loss of generality, the audio data MediaX$_c$ in FIG. 1B can be considered to be compressed according to the MPEG AAC (Advanced Audio Coding) standard for audio coding. According to the DVB standard, the audio media MediaX$_c$ has the double packetized format: the encoded audio frames AAC are encapsulated in PES (Packetized Elementary Stream) packets, which are in turn encapsulated in TS (Transport Stream) packets. Hereafter, extracting an AAC frame implies to select its parent TS packets, parsing the payload of this packet (that is the PES packet) to directly retrieve the AAC frame to be selected without the need of buffering and removing outer packetizations.

The marker unit MU selects at least one sequence of a plurality of AAC frames found at the output of the descrambler DSC: The selected sequence occupies at least one time period T of a predetermined duration and starts at a predetermined AAC frame corresponding to a predetermined audio media time. The time period T is then divided into a predetermined number N of contiguous time windows having each a same duration t and including at least one AAC frame. If certain windows are assigned to receive glitches according to the pattern assigned to this receiver device REC, the marker unit modifies data in these windows by setting to zero the AAC global gain of the AAC frame belonging to that window. Hence, the resulting audio data MediaX$_{cf}$ is marked and continues its path to the Decoder DEC. Instead of the AAC Global Gain, the ScaleFactor or the SpectralData of the concerned AAC frame can be modified to produce the glitch. In these last two cases, the duration of the resulting glitch is more precise than in the first case where it can be a partial duration of one AAC frame. The MPEG 2/4 AAC specification provides more information on Global Gain, ScaleFactor and Spectral Data.

According to another embodiment, the marker unit is placed inside the descrambler DSC of the receiver device REC as shown by FIG. 1C.

The descrambler DSC well knows about the different media streams it currently descrambles through packet identifiers PIDs and associated Control Words to ensure a correct descrambling. The embedded marker unit can, on a well-chosen PID for audio data MediaX$_s$, authorize or refuse the descrambling of some packets. Not doing the descrambling on these packets will create at decoding level a decoding error, which will generate a glitch in the audio decoded sequence according to the pattern assigned to this receiver device REC.

Yet according to other embodiment of the invention, the data represented by MediaX in FIG. 1A, FIG. 1B and FIG. 1C represents video data.

In FIG. 1A, the marker unit MU selects at least one sequence of a plurality of Macroblocks, i.e. a matrix of 16×16 contiguous pixels, found at the output of the decoder DEC: the selected sequence occur in a predetermined video frame, spreading through T number of Macroblocks and the very first Macroblock location is predetermined. Several consecutive Macroblocks are grouped into a plurality of contiguous windows having each the same number of Macroblocks. If certain windows are assigned to glitches according to the pattern assigned to this receiver device REC, the marker unit MU modifies data in these windows by setting the pixels of the associated Macroblocks to zero luminance. Hence, the resulting video frames MediaX$_f$ are marked and sent to the rendering device RD. A T number of Macroblocks can be extended throughout several successive video frames. As an alternative, consecutive video slices or frames can play the role of the above mentioned Macroblocks to produce the glitches according to the pattern.

Without loss of generality, the video data MediaX$_c$ in FIG. 1B can be considered to be compressed according to the MPEG AVC (Advanced Video Coding) standard for video coding. According to the DVB standard, the video media MediaX$_c$ has the double packetized format: the encoded NAL units are encapsulated in PES packets, which are in turn encapsulated in TS packets. Hereafter, extracting a NAL unit implies to select its parent TS packets, parsing the payload of this packet (that is the PES packet) to retrieve the NAL to be selected without the need of buffering and removing outer packetizations.

The marker unit MU selects at least one sequence of a plurality of NAL (Network Abstraction Layer) units of type Intra found at the output of the descrambler DCS: the selected sequence occupies at least T consecutive NALs and starts at a predetermined NAL unit corresponding to a predetermined region in a predetermined video frame in form of a bytes stream or packetized units. Several NAL units are grouped into a plurality of contiguous windows having each the same number t of NAL units. If certain windows are assigned to glitches according to the pattern assigned to this receiver device REC, the marker unit MU sets the NAL type of all or a part of the NAL units of these windows to be skipped in the decoding process. Hence, the resulting video data MediaX$_{cf}$ are marked and continue its path to the decoder DEC. The MPEG 4 AVC specification provides more information on NAL and their different types.

For the video data case, the embedded marker unit in FIG. 1C can, on well-chosen PID for video data MediaX$_s$, authorize or refuse the descrambling of some packets. Not doing the descrambling on these packets will create at decoding level a decoding error, which will generate in general a glitch of type block-effect or even stand-still image—depending on the information-type of the still-scrambled video packet—in the video decoded sequence according to the pattern assigned to the receiver device REC.

The above embodiments detail how to set up a segment T in a time period of contiguous windows upon audio and/or video data, in which audio and/or video data belonging to W number of windows according to a specific pattern are modified to produce glitches. Depending on the nature of media data, glitches can be perceptible in different ways: a silence of short duration, a blurring effect over a group of pixels, etc. . . . . By adjusting the length or duration t of a window, these distortions can be optimized to be less perceptible or even imperceptible.

Other way to reduce the impact of glitch is to optimize the appearance of glitches within the segment T. Hereafter, embodiments will be presented to generate pattern for the segment T having such virtue.

The identifier UA used to generate the pattern preferably consists of a unique identifier of the receiver device or a CAM module (Conditional Access Module) associated to the receiver contributing to descramble the audio and/or video content. A CAM module plugged to the receiver generally supports at least one smartcard, a descrambler module and memories. Document WO2012/022712A1 describes a typical CAM module having a reader for credit card shaped cards, a reader for SIM card shaped cards, a slot for a SD memory card and a descrambler module implemented on a printed circuit board located inside the CAM module.

Before being mapped into a pattern, the identifier is preferably coded by applying a mathematical function or mechanism of Information Transforming such as Tardos coding, CRC Error Signaling method, Reed-Salomon Coding, etc. . . . to further improve the robustness of the identifier during the detection process performed later on.

Figure 2A:
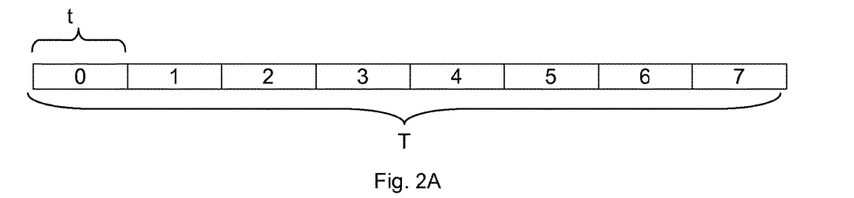
FIGS. 2A and 2B show a simplified example of mapping an identifier into a set of windows within a segment T according to a predefined pattern.
Figure 2B:
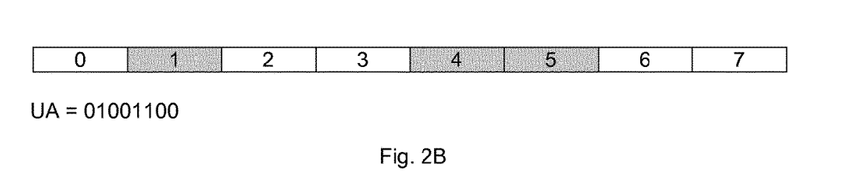

FIGS. 2A and 2B show a simplified example of mapping an identifier into a pattern including a set of windows within a period T. In this case, the glitches occupy the entire window.

The segment T of time period is divided into N contiguous windows having each a length or duration of t. The windows are indexed from 0 to N−1, where N=8 in the example of FIGS. 2A and 2B. The data in a set of W=3 windows (with W<N) is encoded to produce a glitch at positions designated by index 1, 4, and 5. The data in the remaining windows is left intact.

The pattern may represent an identifier UA=01001100 for example where the glitch-windows are forged wherever the correspondent bit location of the UA contains the value 1. The index of the window intended to contain a glitch is thus calculated on the basis of the bit string 01001100 representing the identifier. In other words, the bits 0 are attributed to windows including original data while the bits 1 are attributed to windows including modified data.

In a glitch-window, modification may not necessarily be applied to the whole window but to a fragment of the data into the window. To facilitate the detection, the precise border of the fragment is indifferent, that is modification applied to first half of the window is interpreted in a same way as the modification to a second half of the window, the indices 0 to N−1 of the concerned windows is exclusively essential to identify the pattern. The length or duration of the windows may thus be variable within the segment T.

According to a practical example of mapping identifiers of 32 bit (typical length of an UA) to patterns in a sequence of content data packets, W windows having each an index from 0 to N−1 have to be determined in a way to minimize probability of collision, i.e. when two distinct identifiers have a same pattern.

A collision may be avoided by defining for example a mapping from 32-bit strings to a set of vectors of W numbers between 0 and N−1 that behaves as a pseudorandom function. According to an embodiment of the invention, the 32 bit identifier is converted into a string of 4 bytes. A string transformation is then performed for example with a cryptographic hash function of SHA type, i.e. SHA-512 to produce a sequence of 64 bytes h[0], h[1], h[2], . . . , h[63]. Other mathematical transformation may also be applied on the string.

The first index of the pattern is defined by mapping the first transformed hashed byte h[0] to h[0] (mod N), the second byte h[1] to h[1] (mod N), . . . , and the last Wth byte h[W−1] to h[W−1] (mod N), where "mod N" is the modulo N operator to reduce 256 possible values of h[i] i∈[0 . . . W−1] to N possible indices (number of windows).

In this example, the method works as long as N<256 and W≤64. If the hash function is SHA-256, W≤32 is required.

The number of possible patterns P(W, N) having at max W of windows where glitch is introduced over a total N windows of segment T, is calculated by $$P(W,N)=C(N,1)+C(N,2)+\ldots+C(N,W),$$

where C(N, k) is the binomial coefficient "N choose k".

For example, if N=10 and W=3, there are $$P(3,10)=C(10,1)+C(10,2)+C(10,3)=10+45+120=175$$
distinct patterns.

For patterns uniformly redistributed among the possible identifiers UA, one collision after approximately the square root of P(W, N) selected patterns is expected as demonstrated by the well known birthday paradox. Therefore, to ensure that distinct identifiers UA always give different patterns, the number of active identifiers should be close to the square root of P(W, N). Nevertheless, what matters is not the probability that a collision exists within all the subscribers/identifiers, but the probability that a pirate identifier UA is part of a collision with another subscriber/identifier.

A given pattern can be mapped back to its original identifier UA in at least two different ways:
1. Compute patterns of all active identifiers UA until the calculated pattern matches the given pattern, the associated identifier will be the searched one.
2. Look-up the pattern in a pre-computed table stored in a memory containing all active patterns and corresponding identifiers UA.

For example when 2 million identifiers have to be generated, the total number of windows N for one segment T may be set to N=64 and the number of windows containing glitches may be set to W=7 at max. The number of patterns P(7, 64)=C(64, 1)+C(64, 2)+ . . . +C(64, 7) exceeds $2^{29}$ (=536'870'912) distinct patterns. With 2 million active identifiers UA, there will be approximately $2^{12}$ (=4096) collisions, and thus a given identifier UA is part of a collision with probability close to 1/256.

Moreover, the entropy information of the identifier UA can be increased in order to reduce collisions by concatenating an additional variable parameter Param(8 bits) to the original UA, that is UA(32-bits)+Param(8 bits) where the symbol "+" implies string concatenating operator. This additional parameter Param(8 bits) can be transmitted to the encoder by the processor of the receiver device within a configuration descriptor as the following:

| Parameter | Value | # Bit | Unit |
|---|---|---|---|
| repetition_time | 3 | 16 | Unit |
| glitch_duration | 100 | 16 | Milliseconds |
| Window_duration | 2000 | 16 | Milliseconds |
| number_of_windows | 64 | 16 | Unit |
| number_of_glitches | 7 | 16 | Unit |
| Additional Parameter | 0xff | 8 | Unit |

In this example, the glitch- and window duration are measured in time unit (milliseconds). They can be also measured in number of successive data packets, Macroblocks, slices or frames according to the way of setting up the segment T over the media data.

The additional parameter may be a checksum of the parameters in the configuration descriptor, an indicator of a type of mathematical transformation function used to code the identifier UA, or any other information related to the content of the segment.

In the above configuration, the 32-bit or 4 bytes identifier UA is 0x1c131234 and the 8-bit or 1 byte parameter Param is 0xff. The string "UA+Param" to be hashed is thus 0x1c131234ff.

The SHA-256 hash of this 5-bytes string UA+Param is, in hexadecimal:
0x45f9b393e11173a7514c0427a63cff9940a03898f6c-24e61da3e62bcdf582a98

With W=7, 7 indices (at max) of glitches are calculated according to the invention as the following: each of the first 7 bytes of the hashed UA+Param string (the underlined string) are subject to the mod 64 operator:
0x45=69=5 (mod 64)
0xf9=249=57 (mod 64)
0xb3=179=51 (mod 64)
0x93=147=19 (mod 64)
0xe1=225=33 (mod 64)
0x11=17 (mod 64)
0x73=115=51 (mod 64)

Figure 3:
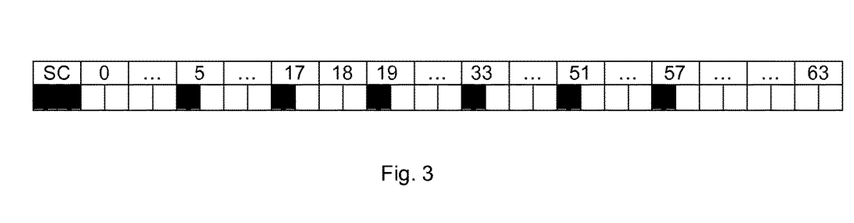
FIG. 3 shows a first practical example of a pattern formed by glitches in 6 windows among 64 indexed windows within a segment T, whose beginning is synchronized with a start code.

The glitch-pattern for the identifier UA 0x1c131234 will thus be at positions with index 5, 17, 19, 33, 51, and 57 as shown by FIG. 3. Two glitches have a same index at position 51 given by mod 64 reductions on bytes 0xb3 and 0x73. This particularity shows that different strings resulting from identifiers hashes may give same patterns due to mod N reductions of the W first bytes (thus producing a collision).

In a further practical example of 1024 identifiers UA, N is set to N=32 windows and the maximum number of glitch-windows W is set to 5, which allows more than P(5, 32)=$2^{17}$ (=131'072) distinct patterns. If there are 1024 ($2^{10}$) identifiers UA, there will be approximately $2.^5$ (=32) collisions, and thus a given UA is part of a collision with probability less than 1/400. The configuration descriptor will be the following:

| Parameter | Value | # Bit | Unit |
|---|---|---|---|
| repetition_time | 3 | 16 | Unit |
| glitch_duration | 100 | 16 | Milliseconds |
| window_duration t | 2000 | 16 | Milliseconds |
| number_of_windows | 32 | 16 | Unit |
| number_of_glitches | 5 | 16 | Unit |
| Additional Parameter | 0xff | 8 | Unit |

In this example, the 32-bit or 4 bytes identifier UA is 0x00c0ffee and the 8-bit or 1 byte parameter is 0xff. The string "UA+Param" to be hashed is thus the 5-byte 0x00c0ffeeff.

The SHA-256 hash of the 5-byte UA+Param is, in hexadecimal:
0x4744308ac6a6034170c7c43656a17fa44bc28181cc45d93-12f17e3da043743e9

There are W=5 indices of glitches determined as each of the first 5 bytes reduced mod 32:
0x47=7 (mod 32)
0x44=4 (mod 32)
0x30=16 (mod 32)
0x8a=10 (mod 32)
0xc6=6 (mod 32)

Figure 4:
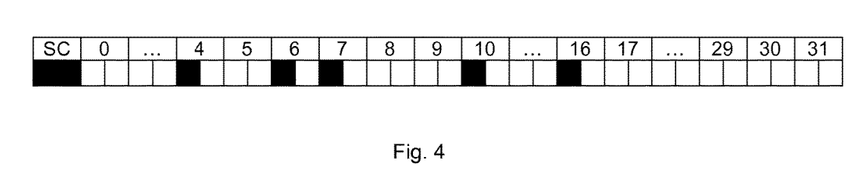
FIG. 4 shows a second practical example of a pattern formed by glitches in 5 windows among 32 indexed windows within a segment T, whose beginning is synchronized with a start code.

The glitch pattern for the identifier 0x00c0ffee will be at positions 4, 6, 7, 10, and 16 as illustrated by FIG. 4.

The segment T begins with Start Code SC which is well identified with 3 specific patterns already presented previously. Then all other glitches would follow the 'glitch_duration' parameter which may have a duration of 1000 msec as in the above configuration.

Window-duration' parameter corresponds to each window unit duration t. Thus a glitch will be contained inside this window length. The Window-duration' should always be longer than 1000 msec, as this is the longest glitch length measured for shorter 'glitch_duration' requested. In other words, a glitch is always entirely accommodated inside the assigned window.

In the above configuration, the same pattern will be repeated 3 times, according to 'repetition_time' parameter. Thus:

For the first practical example, according to the parameters the complete insertion's sequence would last 3×64×2=384 sec, and a maximum of 3×7=21 glitches would be inserted (the time for StartCode is not taken into account).

For the second practical example, according to the parameters the complete insertion's sequence would last 3×32×2=192 sec, and a maximum of 3×5=15 glitches would be inserted (the time for StartCode is not taken into account).

By using the previously explained mechanism, the aims of the invention are achieved by:

Fixing the maximum number of glitches inserted in the audio and/or video content packet sequence of a segment having a settable length T. It depends on the number of identifiers UA to cover, and an estimated lowest number is 2 (1 glitch as a start code, and one more glitch for representing a pattern of segment T—i.e. the set of W times of windows contain only one index)

On-the-fly calculating the pattern to be inserted onto media content from an arbitrary identifier UA. The deducing process is straightforward and relatively not complicated.

Proposing an invertible mapping of the above patterns to audio and/or video data, wherein each segment period and each glitch can be relatively detectable.

The invention claimed is:

1. A method to mark an elementary media content of a stream of digital data packets received by a receiver device, the receiver device comprising at least one processor, memories, a descrambler, a decoder module producing a sequence of elementary media content packets, a marker unit configured to mark by modifying data in the sequence of elementary media content packets according to a pattern defined by an internal parameter associated to the receiving device, the method comprising steps of:

determining, by the marker unit, in the sequence of elementary media content packets at least one segment of a predetermined length and starting at a predetermined position in the sequence;

dividing the segment into a predetermined number of contiguous windows including data of all or part of at least one elementary media content packet;

indexing each window in the segment defined in the sequence of elementary media content packets, each index defining a position of a window in the segment;

coding the internal parameter by applying a mathematical transformation function, obtaining a resulting bits string;

calculating position indices of a predetermined number of windows on the basis of all or a portion of the resulting bits string, said predetermined number of windows being lower than the number of windows in the segment;

modifying data in the windows designated by the calculated position indices, the windows including modified data and the windows including original data form, within the segment of elementary media content packets, a unique pattern representing the internal parameter associated to the receiving device, wherein the modified data produce a detectable distortion;

synchronizing the predetermined start position of the segment in the sequence with a start code producing a detectable distortion distinct from the distortion produced by the modified data in the windows designated by the calculated position indices; and outputting elementary media content data packets including at least one sequence of modified elementary media packets.

2. The method according to claim 1, wherein the sequence of elementary media packets includes a sequence of uncompressed elementary media samples.

3. The method according to claim 1, wherein the sequence of elementary media packets includes a sequence of packetized compressed elementary media.

4. The method according to claim 1, wherein the sequence of elementary media packets includes a sequence of packetized scrambled elementary media.

5. The method according to claim 1, wherein data in the windows designated by the calculated position indices is modified by adding a glitch producing a detectable distortion corresponding to a silence glitch in case of audio data or to distorted blocks of pixels in case of video data.

6. The method according to claim 1, wherein the position indices of each window including data intended to be modified are calculated by a modulo operator applied to each of the first bytes of the bits string representing the transformed internal parameter.

7. The method according to claim 6, wherein an additional parameter is concatenated to the internal parameter before applying the mathematical transformation function, the positions indices being calculated on the basis of the bits string representing the transformed internal parameter concatenated with the additional parameter.

8. The method according to claim 7, further comprising: receiving by the marker unit a configuration descriptor in addition to the internal parameter, the configuration descriptor comprising at least parameters defining the segment length or duration, the number of windows within the segment, the number of windows containing modified elementary media data, a duration of the detectable distortion within a window, the additional parameter to be concatenated to the internal parameter before applying the mathematical transformation function.

9. The method according to claim 7, wherein the additional parameter comprises a checksum of the parameters in the configuration descriptor, an indicator of a type of mathematical transformation function used to code the internal parameter or any other information related to the content of the segment.

10. The method according to claim 1, wherein the mathematical transformation function comprises a cryptographic hash function of SHA type.

11. The method according to claim 1, wherein the media data modified in a window designated by a calculated position index comprise data intentionally let scrambled by the descrambler.

12. The method according to claim 1, wherein the detectable distortion produced by the modified data in the windows designated by the calculated position indices corresponds to a silence glitch in case of audio data or to distorted blocks of pixels in case of video data.

13. A receiver device configured to mark an elementary media content of a stream of digital data packets comprising:
   at least one processor;
   memories;
   a descrambler;
   at least one decoder module configured to produce a sequence of elementary media content packets; and
   a marker unit configured to mark by modifying data in the sequence of elementary media content packets according to a pattern defined by an internal parameter associated to the receiving device;
   wherein the marker unit is configured to:
      determine, in a sequence of elementary media content packets, at least one segment of a predetermined length and starting at a predetermined position in the sequence;
      divide the segment into a predetermined number of contiguous windows including data of all or part of at least one elementary media content packet;
      index each window in the segment defined in the sequence of elementary media content packets, each index defining a position of a window in the segment;
      code the internal parameter by applying a mathematical transformation function, obtaining a resulting bits string;
      calculate position indices of a predetermined number of windows on the basis of all or a portion of the resulting bits string, said predetermined number of windows being lower than the number of windows in the segment;
      modify data in the windows designated by the calculated position indices, the windows including modified data and the windows including original data form, within the segment of elementary media content packets, a unique pattern representing the internal parameter associated to the receiving device, wherein the modified data produce a detectable distortion;

synchronize the predetermined start position of the segment in the sequence with a start code producing a detectable distortion distinct from the distortion produced by the modified data in the windows designated by the calculated position indices; and output elementary media content data packets including at least one sequence of modified elementary media packets.

14. The receiver device according to claim 13, wherein the marker unit is located either after the decoder module, or after the descrambler module or embedded inside the descrambler module.

15. The receiver device according to claim 13, wherein the marker unit is configured to produce detectable distortion on the modified data in the windows designated by the calculated position indices in form of a silence glitch in case of audio data or distorted blocks of pixels in case of video data.

* * * * *